United States Patent
Ting et al.

(10) Patent No.: US 8,881,973 B2
(45) Date of Patent: Nov. 11, 2014

(54) CONNECTION SETTING METHOD USING BARCODE PATTERN, CONNECTION SETTING SYSTEM AND USER EQUIPMENT THEREOF

(75) Inventors: Kuei-Ping Ting, New Taipei (TW); Chao-Kuang Yang, New Taipei (TW); Li-Wei Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 107 days.

(21) Appl. No.: 13/603,423

(22) Filed: Sep. 5, 2012

(65) Prior Publication Data

US 2013/0299570 A1 Nov. 14, 2013

(30) Foreign Application Priority Data

May 8, 2012 (TW) .............................. 101116382 A

(51) Int. Cl.
*G06F 17/00* (2006.01)
(52) U.S. Cl.
USPC ...... 235/375; 235/383; 235/454; 235/462.01; 235/462.09; 235/462.15
(58) Field of Classification Search
CPC ... G06K 7/14; G06K 7/1417; G06K 17/0022; G06K 19/00; H04T 2001/217; H04T 2001/103
USPC ................... 235/375, 462.01, 462.09, 462.15
See application file for complete search history.

(56) References Cited

U.S. PATENT DOCUMENTS 7,861,933 B2 * 1/2011 Zsigmond et al. ....... 235/462.01

FOREIGN PATENT DOCUMENTS

TW 200745967 12/2007
TW 200840316 10/2008

* cited by examiner

*Primary Examiner* — Kristy A Haupt
(74) *Attorney, Agent, or Firm* — Jianq Chyun IP Office

(57) ABSTRACT

A connection setting method using a barcode pattern, a connection setting system and user equipment (UE) thereof are provided. The method includes the following steps. A connection application is installed in each of at least two pieces of UE respectively. First UE performs setting for connecting to an electronic device by a default mode and generates the barcode pattern accordingly. Then, an image capture unit of second UE is activated to capture the barcode pattern. The barcode pattern is analyzed by the connection application of the second UE, so as to obtain a plurality of parameters of connection setting in regard to the electronic device. Connection setting is performed automatically according to the parameters, such that the second UE connects to the electronic device and performs data transmission.

9 Claims, 7 Drawing Sheets

CONNECTION SETTING METHOD USING BARCODE PATTERN, CONNECTION SETTING SYSTEM AND USER EQUIPMENT THEREOF

CROSS-REFERENCE TO RELATED APPLICATION

This application claims the priority benefit of Taiwan application serial no. 101116382, filed on May 8, 2012. The entirety of the above-mentioned patent application is hereby incorporated by reference herein and made a part of this specification.

1. Field of the Invention

The invention relates to a connection setting method, and more particularly, to a connection setting method using a barcode pattern.

2. Description of Related Art

Now many apparatuses in the market are adapted not only for wired connection but also for wireless connection through a wireless network, such as Wireless Fidelity (WiFi), for connecting to each other, so as to achieve two-way data transmission. However, the steps for setting up a connection between the apparatuses are complicated and have quite a few limitations, and it might require the users to repeat the connection settings several times before the connection is successful, which is fairly inconvenient and time-consuming for the users.

Take the existing network printers as an example, user equipment (such as computer device) can be connected to the network printer via Wi-Fi communication protocol. However, during the process of setting the network printer, the user is required to manually set each step of the connection setting in every computer device so as to connect to the network printer. For example, each computer device requires the user to manually input parameters, such as IP address of the same domain, printer model number, etc., for connection. The steps of connection setting are complicated and time-consuming. Because different manufacturers may support different network printer models, the chance of successful connection is usually low, and thus it is very inconvenient for the users to repeatedly conduct the same setting operations.

SUMMARY OF THE INVENTION

Accordingly, the invention is directed to a connection setting method using a barcode pattern and a connection setting system, which allow user equipment to obtain information required for establishing a connection by capturing the barcode pattern, so as to promptly complete connection setting.

The invention is directed to user equipment, which outputs a barcode pattern by a default mode and reads the barcode pattern by a scan mode, so as to simplify steps of connection setting for connecting the user equipment to a common electronic device.

The invention provides a connection setting method using a barcode pattern, and the connection setting method is adapted for at least two pieces of user equipment performing setting for connecting to an electronic device for data transmission. The method includes the following steps. First, a connection application is installed in each of the two pieces of user equipment respectively. First user equipment among the two pieces of user equipment performs setting for connecting to the electronic device by a default mode and generates the barcode pattern accordingly. Then, an image capture unit of second user equipment among the two pieces of user equipment is activated to capture the barcode pattern. The barcode pattern is analyzed by the connection application of the second user equipment, so as to obtain a plurality of connection setting parameters in regard to the electronic device, and automatically perform connection setting according to the connection setting parameters, thereby connecting the second user equipment to the electronic device.

In an embodiment of the invention, the barcode pattern includes a one-dimensional (1D) barcode, a two-dimensional (2D) barcode, or a three-dimensional (3D) barcode.

The invention further provides user equipment, which is adapted for performing connection setting for connecting to an electronic device for data transmission. The user equipment includes an image capture unit and a connection application coupled to the image capture unit. Herein, when the user equipment performs setting for connecting to the electronic device by a default mode, the connection application generates a barcode pattern accordingly. When the user equipment performs setting for connecting to the electronic device by a scan mode, the image capture unit captures the barcode pattern, and the connection application analyzes the barcode pattern, so as to obtain a plurality of connection setting parameters in regard to the electronic device. In addition, the connection application automatically performs the connection setting according to the connection setting parameters, so as to connect the user equipment to the electronic device.

The invention further provides a connection setting system using a barcode pattern, and the connection setting system includes an electronic device, first user equipment, and second user equipment. Herein, the first user equipment includes a connection application, which performs setting for connecting to the electronic device by a default mode and then generates the barcode pattern accordingly. The second user equipment includes the connection application and an image capture unit. The image capture unit is used to capture the barcode pattern. The connection application analyzes the barcode pattern to obtain a plurality of connection setting parameters in regard to the electronic device. In addition, the connection application automatically performs the connection setting according to the connection setting parameters, so as to connect to the electronic device.

Based on the above, the connection setting method and system that use the barcode pattern, and the user equipment thereof provided by the invention utilize the barcode pattern to define the connection setting information between the user equipment and the electronic device, which allows the user equipment to obtain information required for establishing the connection by capturing the barcode pattern, so as to promptly complete the connection setting.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
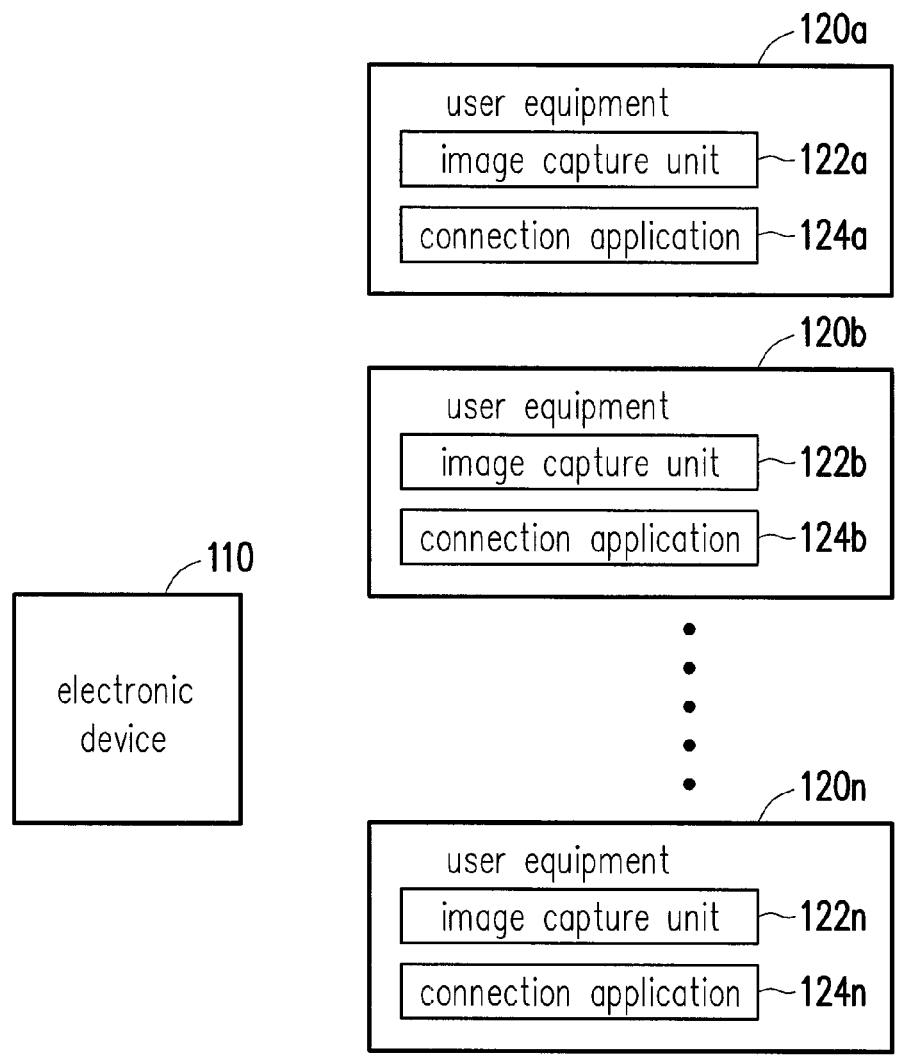
FIG. 1 is a block diagram illustrating a connection setting system according to an embodiment of the invention.

FIG. 1 is a block diagram illustrating a connection setting system according to an embodiment of the invention. Referring to FIG. 1, a connection setting system 100 of the present embodiment includes an electronic device 110 and user equipment 120a, 120b, ... 120n. Herein, the electronic device 110 is a network printer, a scanner, a network drive, etc., for example, which is simultaneously accessible to the user equipment 120a-120n. The user equipment 120a-120n is a personal computer, a laptop computer, a tablet computer, a smart phone, etc., for example, which provides a function of wired or wireless network access. However, the electronic device 110 and the user equipment 120a-120n of the invention are not limited to the above. It should be noted that the number of user equipment is not limit here as well.

It is noted that the electronic device 110 and the user equipment 120a-120n may be connected to each other via wireless or wired connection, wherein the wireless connection refers to a connection technology, such as Wireless Fidelity (WiFi), Bluetooth, Zigbee wireless access, Worldwide Interoperability for Microwave Access (WiMAX), or Third Generation Telecommunication (3G), etc. Otherwise, the user equipment 120a-120n may be connected to the electronic device 110 via Asymmetric Digital Subscriber Line (ADSL). However, the connection of the invention is not limited to the above.

In addition, each of the user equipment 120a-120n respectively includes an image capture unit 122a-122n and a connection application 124a-124n. Each of the image capture units 122a-122n includes a lens, a sensor element, and an aperture, etc., used to capture a barcode pattern. The connection applications 124a-124n are used to generate the barcode pattern or to analyze the barcode pattern, which allows the user equipment 120a-120n to connect to the electronic device 110 through use of the barcode pattern.

Figure 2:
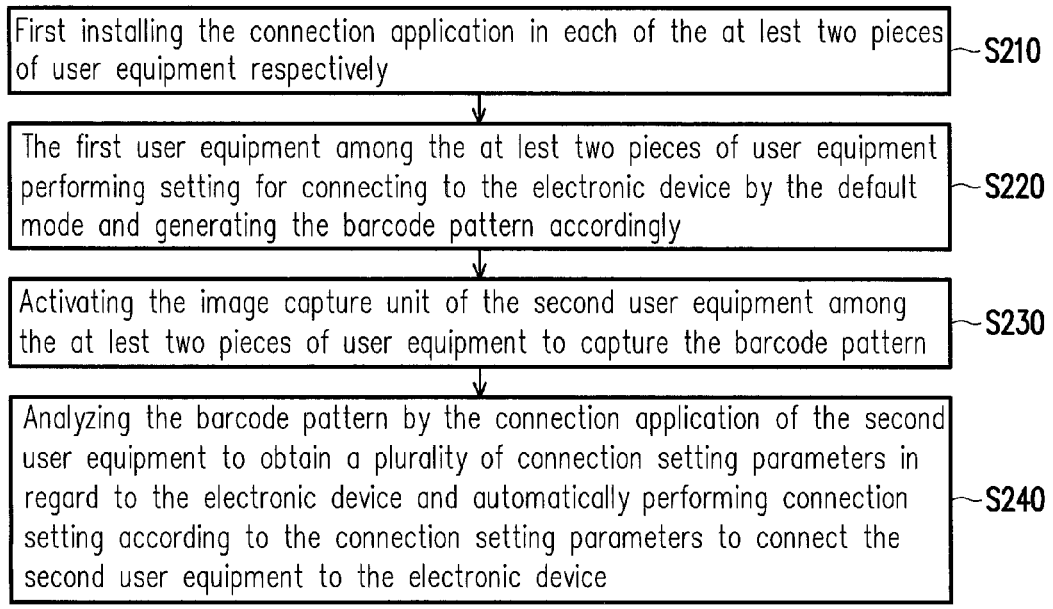
FIG. 2 is a flowchart illustrating a connection setting method according to an embodiment of the invention.

FIG. 2 is a flowchart illustrating a connection setting method according to an embodiment of the invention. The method of the present embodiment is adapted for the connection setting system 100 of FIG. 1. Detailed steps of the connection setting method of the present embodiment are elaborated below with reference to each element of the connection setting system 100.

First, in Step S210, the connection applications 124a-124n are respectively installed to the user equipment 120a-120n. After the installation is completed, Step S220 is carried out, wherein first user equipment performs setting for connecting to the electronic device 110 by a default mode and generates the barcode pattern accordingly. In the above, the first user equipment is one of the user equipment 120a-120n. To facilitate the explanation, the first user equipment is set as the user equipment 120a hereinafter. It is noted that, the default mode refers to a mode that the user follows prescribed steps for setting the connection for the first user equipment 120a.

For example, given that the electronic device 110 of the present embodiment is a network printer, the user is required to input or select basic information related to the network printer, such as IP address, printer model number, printer version information, or connection type, etc. That is to say, the first user equipment 120a requires different connection settings according to different electronic devices 110. Therefore, the steps that are performed for connection setting in the default mode are determined based on the types of the electronic devices 110.

In addition to the above, when the user performs connection setting step by step for the first user equipment 120a, the connection application 124a simultaneously records the basic information related to the network printer inputted or selected by the user and encodes the basic information to generate the barcode pattern. The barcode pattern includes a one-dimensional (1D) barcode, a two-dimensional (2D) barcode, or a three-dimensional (3D) barcode, but the invention is not limited thereto, and the user may select different coding according to the actual need.

In the present embodiment, the barcode pattern generated by the connection application 124a is, for example, directly transmitted to the network printer for printing, and the printed barcode pattern is shared with other user equipment 120b-120n. In another embodiment, the barcode pattern generated by the connection application 124a is directly transmitted to other user equipment 120b-120n via a wired or wireless network.

Then, in Step S230, the second user equipment that receives the barcode pattern activates the image capture unit to capture the barcode pattern. The second user equipment refers to one or more of the user equipment 120b-120n, for example. To facilitate the explanation, the second user equipment is set as the user equipment 120b hereinafter. After the image capture unit 122b of the second user equipment 120b captures the barcode pattern, the barcode pattern is transmitted to the connection application 124b.

Next, as shown in Step S240, the connection application 124b analyzes the barcode pattern to obtain a plurality of connection setting parameters in regard to the electronic device 110 and automatically perform connection setting according to the connection setting parameters, so as to connect the second user equipment 120b to the electronic device 110. To be more specific, the connection application 124b decodes the barcode pattern to obtain information, such as a series of numbers or symbols, and performs table lookup and conversion to obtain a plurality of connection setting parameters in regard to the electronic device 110. Accordingly, the connection application 124b directly uses the connection setting parameters obtained after decoding to perform setting. After the setting is completed, the second user equipment 120b is connected to the electronic device 110 for data transmission.

Based on the above, after the user equipment 120b-120n respectively activates the image capture units 122b-122n, the user only needs to direct the lenses of the image capture units 122b-122n to the barcode pattern of the electronic device 110 to capture the barcode pattern, such that the user equipment 120b-120n uses the information obtained by decoding the barcode pattern to complete the setting for connection with the electronic device 110 automatically.

Given that the user is required to manually set each user equipment and averagely the user needs to perform M keyboard operations to manually input the connection setting for the connection between the user equipment and the electronic device. Since the number of the user equipment is N, the user has to perform M*N keyboard operations in total, wherein M and N are both positive integers. By contrast, according to the present embodiment, the user only needs to manually complete the connection setting between the first user equipment and the electronic device. For the other user equipment, the user only performs one step to capture the barcode pattern, and the other user equipment can automatically perform connection setting. Therefore, the user only performs (M+(N−1))

keyboard operations in total. It is known from the above that the invention greatly reduces the number of keyboard operations that the user performs connection setting on multiple user equipment.

Figure 3:
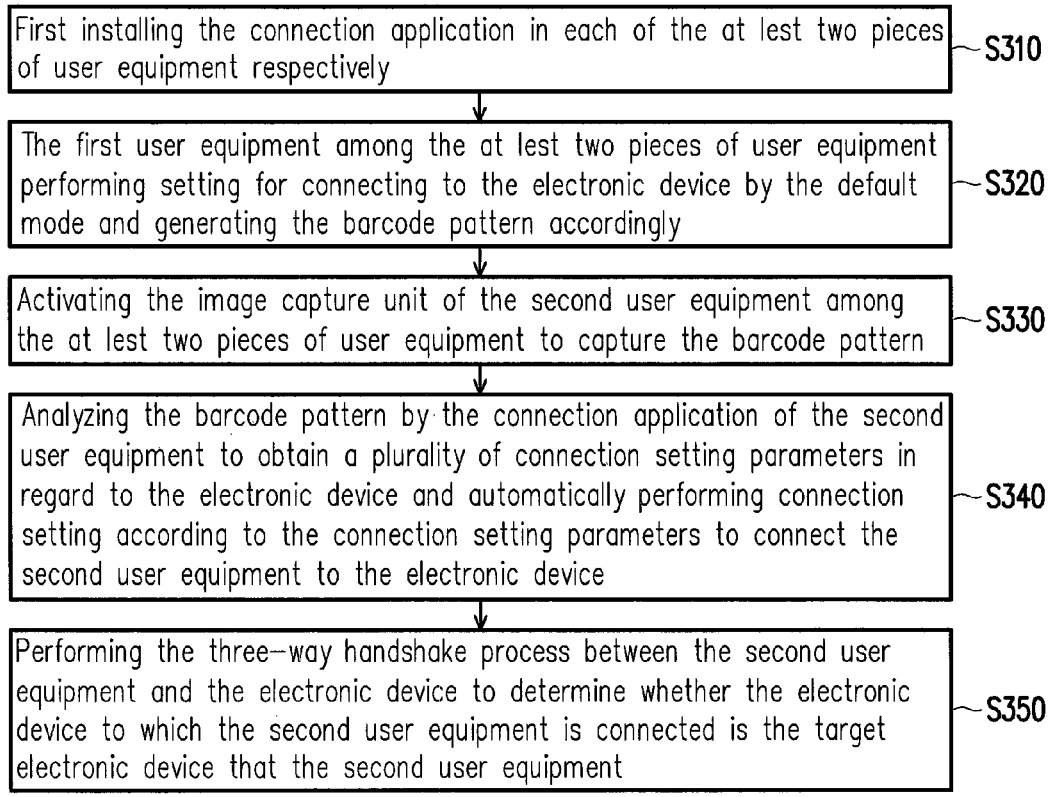
FIG. 3 is a flowchart illustrating a connection setting method according to another embodiment of the invention.

FIG. 3 is a flowchart illustrating a connection setting method according to another embodiment of the invention. The method of the present embodiment is also adapted for the connection setting system 100 of FIG. 1. Please refer to FIG. 1 and FIG. 3 at the same time.

First, a connection application is installed in each of the at least two pieces of user equipment respectively (Step S310). Next, first user equipment among the at least two pieces of user equipment performs setting for connecting to an electronic device by a default mode and generates a barcode pattern accordingly (Step S320). Then, second user equipment among the at least two pieces of user equipment performs setting for connecting to the electronic device by a scan mode. Herein, the scan mode is to activate an image capture unit of the second user equipment to capture the obtained barcode pattern (Step S330). Thereafter, the connection application of the second user equipment analyzes and decodes the captured barcode pattern to obtain a plurality of connection setting parameters in regard to the electronic device, and automatically performs connection setting according to the connection setting parameters, so as to connect the second user equipment to the electronic device without any manual input or setting from the user (Step S340).

A difference between this embodiment and the above embodiment lies in that: after connecting the second user equipment to the electronic device, the connection setting method of the present embodiment further includes performing a three-way handshake process between the second user equipment and the electronic device to determine whether the electronic device to which the second user equipment is connected is a target electronic device that the second user equipment is intended to connect (Step S350).

For example, in a company environment, there may be many types of electronic devices, such as network printer, scanner, network drive, etc., for users to share and access, and the number of each type of electronic device may be more than one. Therefore, the three-way handshake process may be performed to confirm if the electronic device to which the second user equipment is connected through the barcode pattern is the target electronic device that the user wishes to connect. To be more specific, the second user equipment inquires the electronic device about the connection setting parameters obtained through decoding. The electronic device determines whether the connection setting parameters are correct. If the connection setting parameters are correct, the electronic device replies a message indicating correctness to the user equipment. After receiving the message indicating correctness, the user equipment transmits test data to the electronic device to perform access or printing, etc. and thereby confirms that the connected electronic device is the target electronic device.

Details of Steps S310-S340 are the same as or similar to Steps S210-S240 of the previous embodiment, so the descriptions thereof are not repeated hereinafter.

Moreover, it is noted that the connection applications 124a-124n of the user equipment 120a-120n shown in FIG. 1 further provide user interfaces (UI) respectively arranged for receiving input operation signals from the user, and according to the operations selected by the user, determine whether to use the barcode pattern to perform the connection setting between the user equipment 120a-120n and the electronic device 110.

FIG. 4A to FIG. 4I are schematic views that exemplify using a user interface to perform a connection setting method according to yet another embodiment of the invention. The method of the present embodiment is adapted for the connection setting system 100 of FIG. 1. In the present embodiment, the electronic device 110 is a network printer, and the user equipment 120a-120n are personal computers or laptop computers respectively. Please refer to FIG. 1 and FIGS. 4A-4I.

Figure 4A:
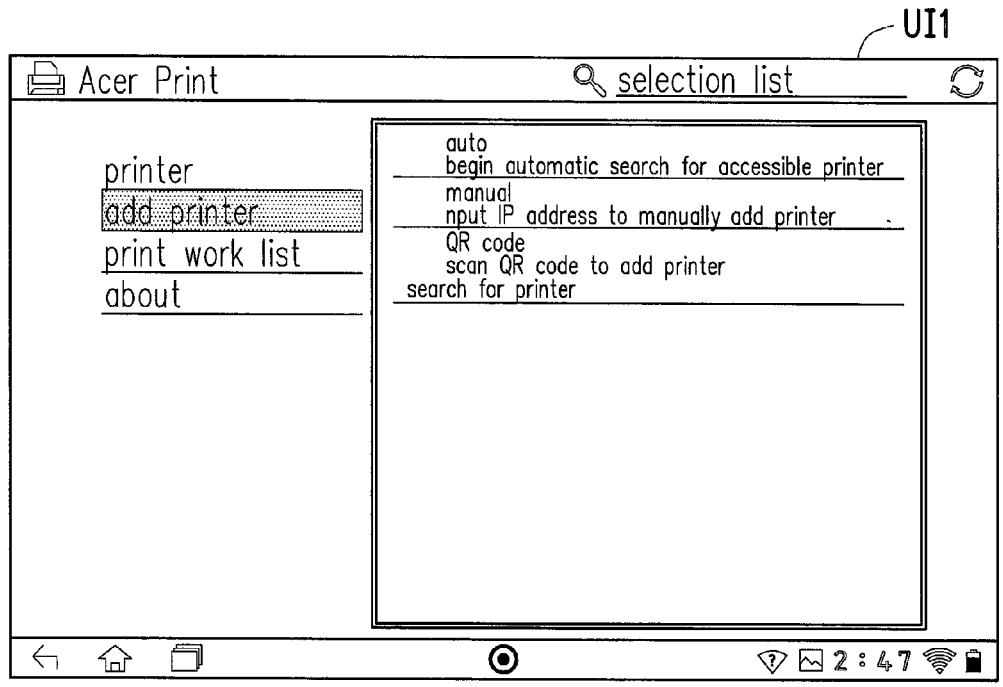
FIG. 4A to FIG. 4I are schematic views that exemplify using a user interface to perform a connection setting method according to yet another embodiment of the invention.
Figure 4B:
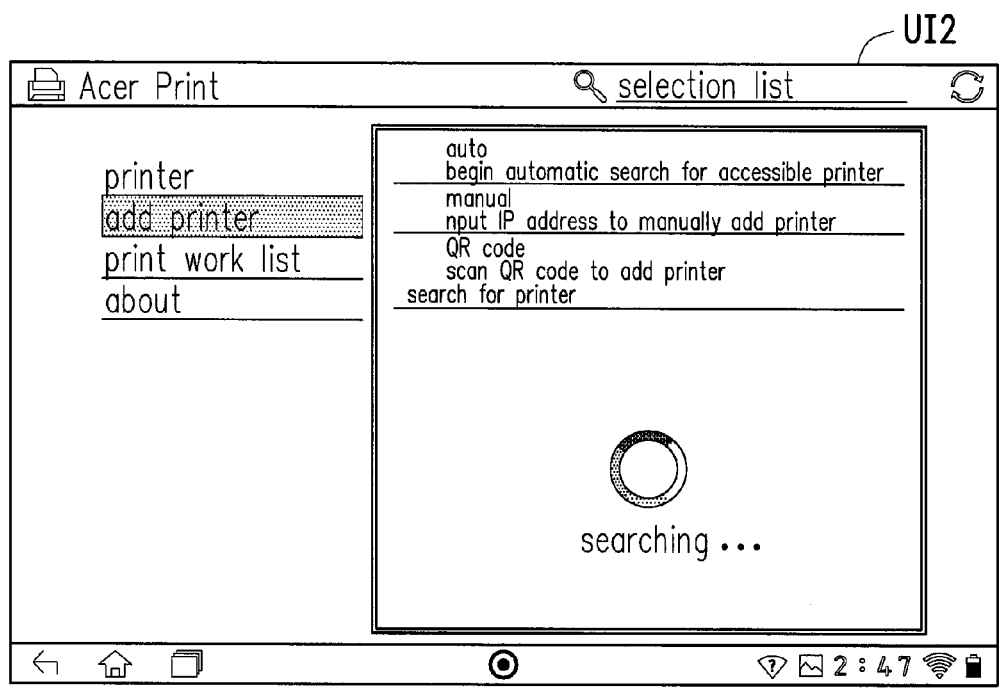
Figure 4C:
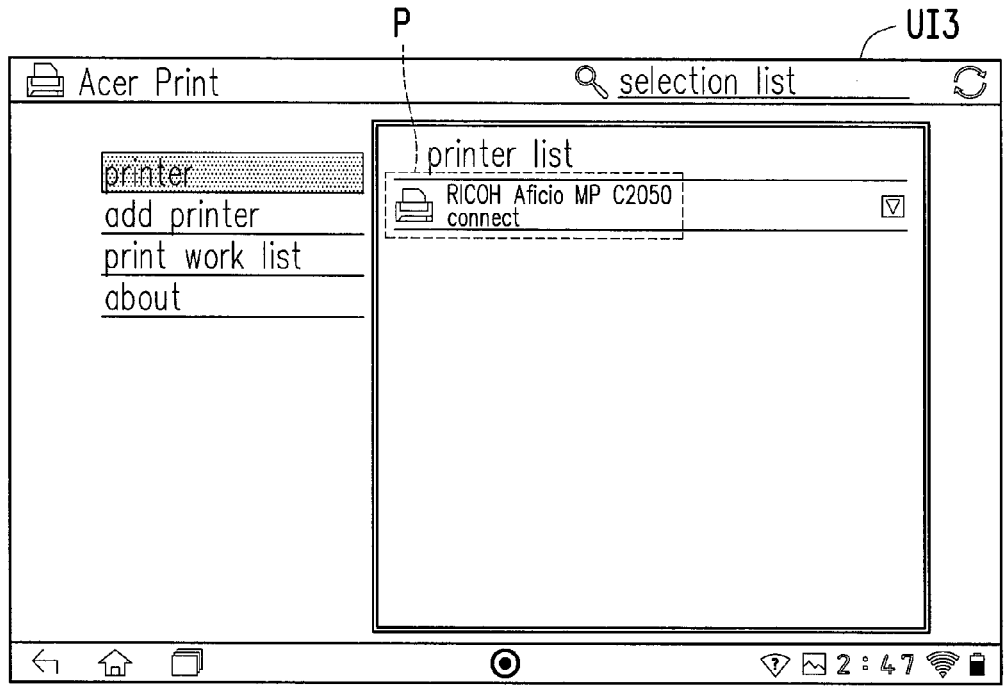
Figure 4D:
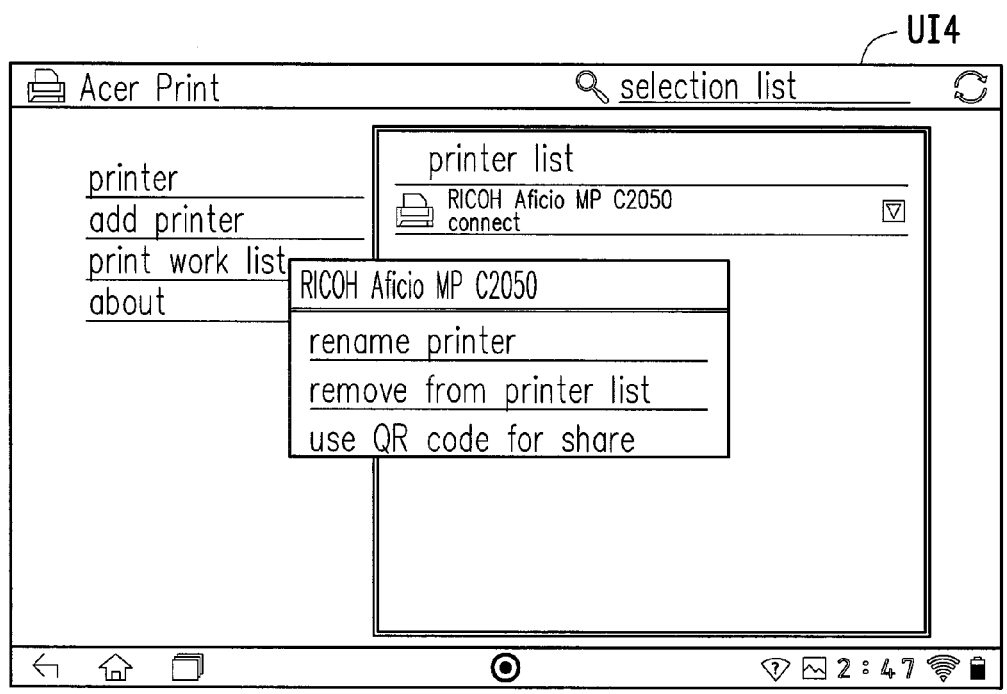

To facilitate the explanation below, the user equipment 120a among the user equipment 120a-120n is set as the first user equipment that performs setting for connecting to the electronic device 110. As shown in FIG. 4A, after the user equipment 120a displays a user interface UI1 of the connection application 124a, the user selects a setting page "add printer" and selects to complete connection setting automatically or manually. Then, as shown in FIG. 4B, after the user sets or inputs information, such as IP address, etc., regarding the network printer, the connection application 124a of the user equipment 120a enters a state of searching network printer, and a user interface UI2 displays a sign of "searching" correspondingly. After the connection application 124a matches the model number of the searched network printer with a database and finishes the setting of a driver program, the connection setting between the user equipment 120a and the electronic device 110 is completed. As shown in FIG. 4C, a user interface UI3 displays a printer icon P indicating that the connection setting is completed.

In an embodiment, for example the user displays a function menu (i.e. a user interface UI4 of FIG. 4D) by long pressing the stored printer icon P and selects "use QR code for share," such that the connection application 124a performs encoding to generate a QR code. Herein, the QR code is a Quick Response Code. The QR code contains basic information related to the network printer, such as version information of the network printer, name information, MAC address, IP address, location information, network printer function or connection type, etc., which is not limited to the foregoing.

Figure 4E:
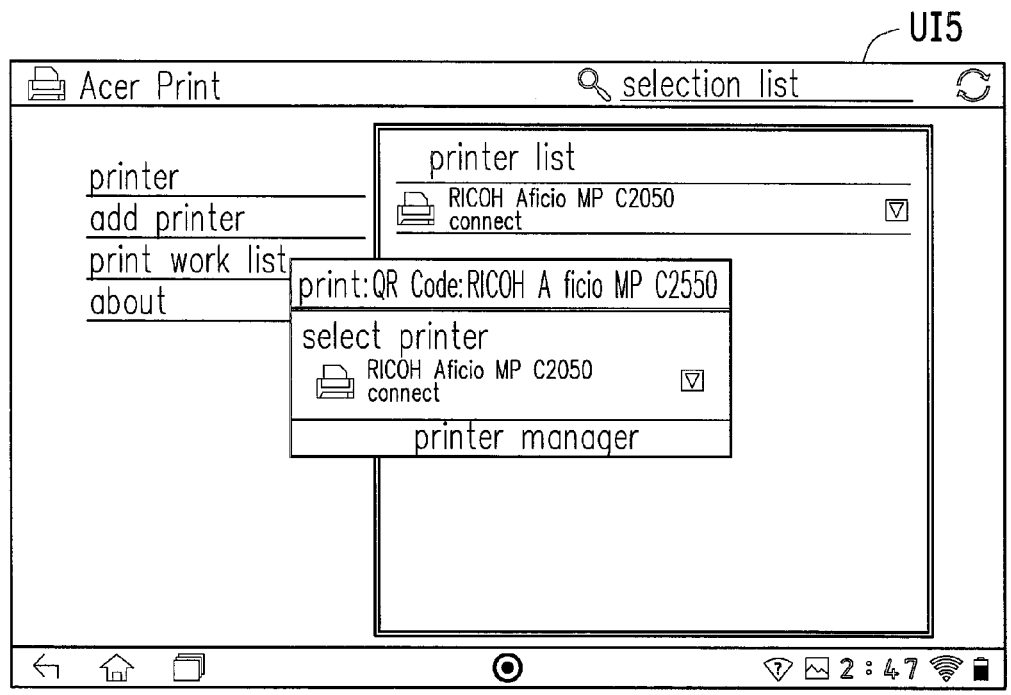
Figure 4F:
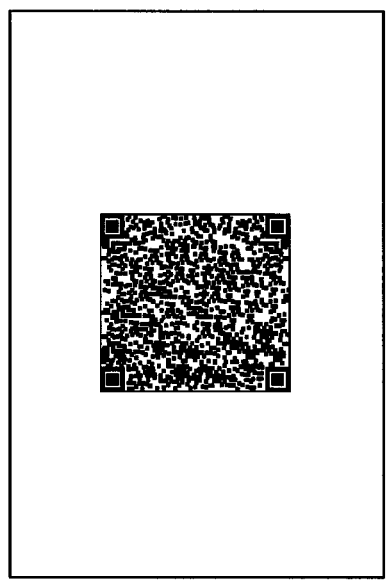

Thereafter, as shown in FIG. 4E, since the electronic device 110 is a network printer, the user equipment 120a may directly use the connected electronic device 110 to print out the QR code, as illustrated in FIG. 4F.

After the user equipment 120a outputs the QR code, the user equipment 120b-120n analyzes the QR code respectively by the connection applications 124b-124n.

Figure 4G:
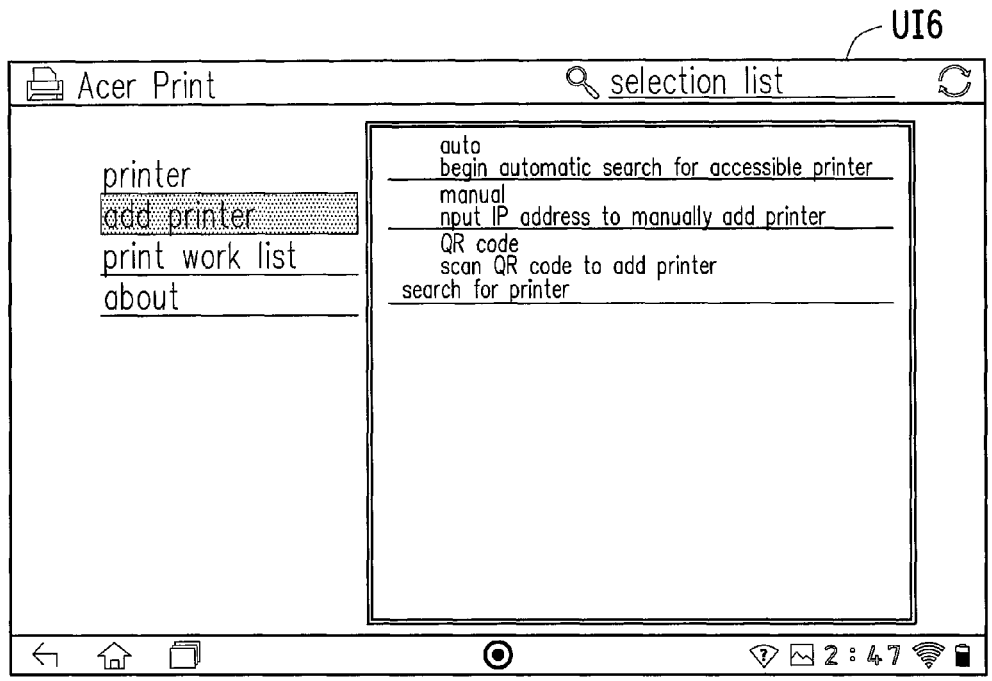
Figure 4H:
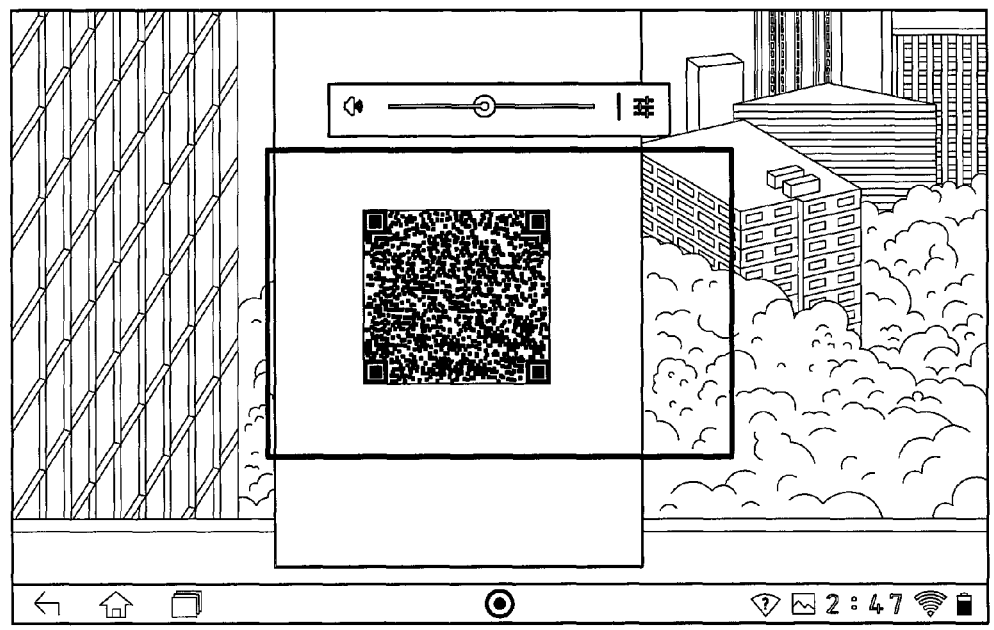
Figure 4I:
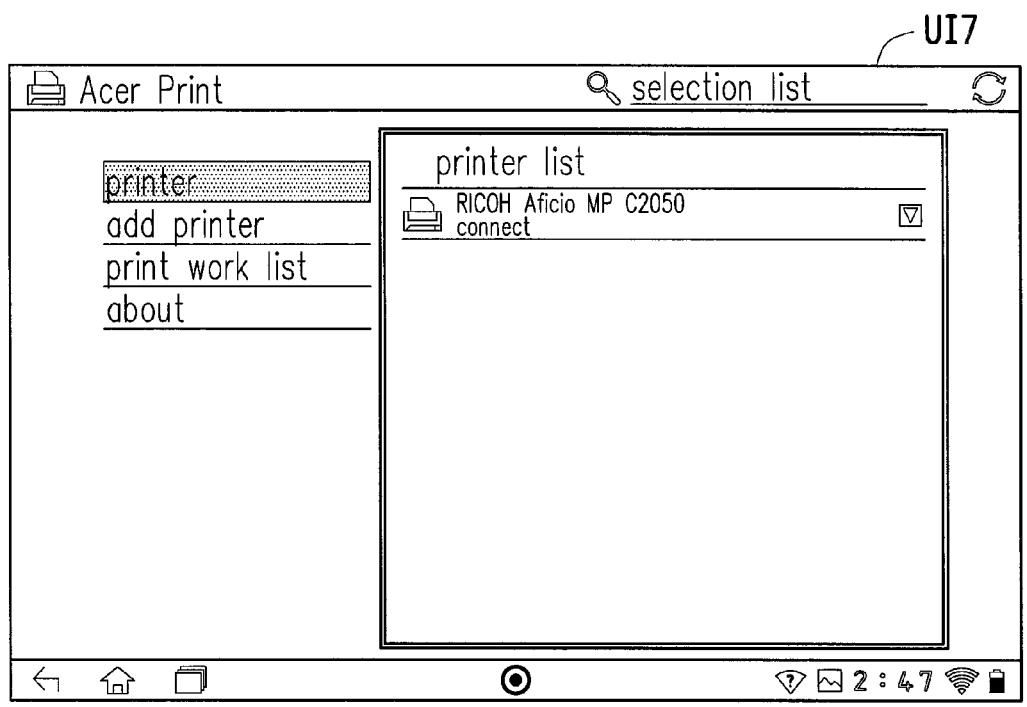

Take the user equipment 120b as an example, as illustrated in FIG. 4G, in a user interface UI6 provided by the connection application 124b, the user directly selects "QR code" in the page of "add printer" (i.e. scan QR code to add printer). As shown in FIG. 4H, the image capture units 122b-122n of the user equipment 120b are activated, and then the user only needs to point the lenses to the QR code for capturing. Finally, the connection application 124b decodes the QR code and directly uses the information obtained from the decoding to perform connection setting, so as to complete the setting of the network printer (as shown in FIG. 4I). The user interfaces provided by the invention are clear and easy to understand, which help the user to select and operate.

In conclusion of the above, the invention first completes the connection setting between the first user equipment and the common electronic device by normal setting steps to generate a set of barcode pattern with connection setting parameters of the common electronic device, and then prints out the barcode pattern to share with other user equipment, such that other user equipment can complete the connection setting in one step by scanning the barcode pattern. In a word, the invention uses barcode pattern to define the information of connection setting of the common electronic device and accordingly allows the user equipment to obtain the information required for establishing connection by capturing the barcode pattern to promptly complete the connection setting, so as to improve convenience and reduce time for connection setting.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A connection setting method using a barcode pattern, adapted for at least two pieces of user equipment performing setting for connecting to an electronic device for data transmission, the method comprising:

installing a connection application in each of the two pieces of user equipment respectively;

performing the setting for connecting to the electronic device by a default mode in first user equipment among the two pieces of user equipment and generating the barcode pattern accordingly;

activating an image capture unit of second user equipment among the two pieces of user equipment to capture the barcode pattern; and analyzing the barcode pattern by the connection application of the second user equipment to obtain a plurality of connection setting parameters in regard to the electronic device, and automatically performing connection setting according to the connection setting parameters to connect the second user equipment to the electronic device, wherein the method further comprises the following step after the step of automatically performing connection setting according to the connection setting parameters to connect the second user equipment to the electronic device:

performing a three-way handshake process between the second user equipment and the electronic device to determine whether the electronic device to which the second user equipment is connected is a target electronic device that the second user equipment is intended to connect.

2. The method according to claim 1, wherein the barcode pattern comprises a one-dimensional barcode, a two-dimensional barcode, or a three-dimensional barcode.

3. The method according to claim 1, wherein the step of generating the barcode pattern by the first user equipment comprises:

generating the barcode pattern by the connection application of the first user equipment and printing out the barcode pattern by a printing device for the second user equipment to obtain and capture.

4. The method according to claim 1, further comprising:

receiving an input operation signal from a user through user interfaces respectively provided by the connection applications of the first and the second user equipment, and accordingly determining whether to perform the connection setting between the user equipment and the electronic device by the barcode pattern.

5. An user equipment, adapted for performing setting for connecting to an electronic device for data transmission, the user equipment comprising:

an image capture unit; and a connection application, coupled to the image capture unit, wherein when the user equipment performs the setting for connecting to the electronic device by a default mode, the connection application generates a barcode pattern accordingly, wherein when the user equipment performs the setting for connecting to the electronic device by a scan mode, the image capture unit captures a barcode pattern and the connection application analyzes the barcode pattern to obtain a plurality of connection setting parameters in regard to the electronic device and automatically perform connection setting according to the connection setting parameters to connect the user equipment to the electronic device, wherein when the user equipment performs connection setting by the scan mode and is connected to the electronic device, the user equipment further performs a three-way handshake process to determine whether the electronic device to which the user equipment is connected is a target electronic device that the user equipment is intended to connect.

6. The user equipment according to claim 5, wherein the barcode pattern comprises a one-dimensional barcode, a two-dimensional barcode, or a three-dimensional barcode.

7. The user equipment according to claim 5, wherein when the user equipment performs connection setting by the default mode:

the user equipment is further connected to a printing device and transmits the barcode pattern generated by the connection application to the printing device for printing.

8. The user equipment according to claim 5, wherein the connection application further comprises:

a user interface, arranged for receiving an input operation signal from a user, wherein the connection application determines whether to connect to the electronic device by the default mode or the scan mode according to the input operation signal.

9. A connection setting system using a barcode pattern, comprising:

an electronic device;

first user equipment, comprising a connection application and performing setting for connecting to the electronic device by a default mode, wherein the connection application generates the barcode pattern accordingly; and second user equipment, comprising a connection application and an image capture unit, wherein the image capture unit captures the barcode pattern, and the connection application analyzes the barcode pattern to obtain a plurality of connection setting parameters in regard to the electronic device and automatically perform connection setting according to the connection setting parameters to connect to the electronic device, wherein when the second user equipment automatically performs connection setting according to the connection setting parameters to connect to the electronic device, the second user equipment performs a three-way handshake process to determine whether the electronic device to which the second user equipment is connected is a target electronic device that the second user equipment is intended to connect.

* * * * *